Feb. 9, 1943. H. E. FRITZAM ET AL 2,310,414
ELEVATOR CAR
Filed Oct. 1, 1940 2 Sheets-Sheet 2
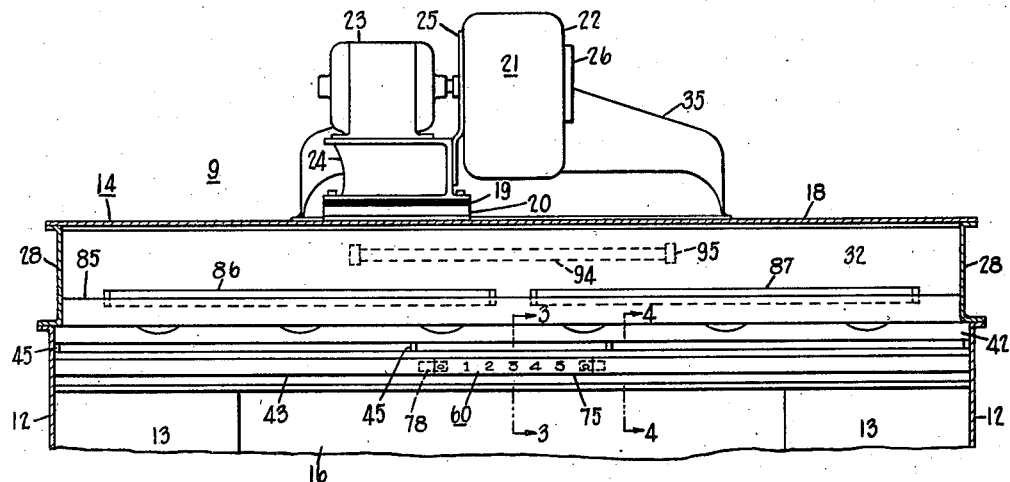

Patented Feb. 9, 1943

2,310,414

UNITED STATES PATENT OFFICE 2,310,414

ELEVATOR CAR

Harry Emil Fritzam, Jamaica, and Morrison John Brounn, Forest Hills, N. Y., assignors to Otis Elevator Company, New York, N. Y., a corporation of New Jersey Application October 1, 1940, Serial No. 359,210

1 Claim. (Cl. 98—33)

The invention relates to elevator cars and especially to the construction of the cars to provide ventilation.

In elevator cars, especially those in which the cab is closed during operation by a solid car door, it is desirable to provide means for circulating air through the interior of the cab. It is also desirable to provide such means without material sacrifice to equipment provided in the cab or to the construction of the cab itself.

One feature of the invention resides in the construction of an elevator car in which a plenum chamber is formed along the front of the car at the top thereof and has elongated orifices extending across the front of the car to distribute air supplied from a blower on top of the car throughout the cab in a manner both efficient and agreeable to the passengers.

Another feature of the invention is the construction of an elevator car having a blower for supplying air to the car to effect the ventilation thereof in which the ventilation is effected substantially without vibration and noise.

Still another feature of the invention resides in an elevator car having a ventilating system and various appurtenances such as a position indicator and indirect lighting in which the parts are so constructed and arranged that economy of manufacture, pleasing appearance and efficiency in use are obtained without material sacrifice of space.

In carrying out the invention according to the preferred arrangement, a blower is positioned on top of the car on a substantially non-vibration transmitting mounting. This blower is connected by a substantially non-vibration transmitting duct to a plenum chamber formed preferably across the front of the cab directly beneath the top. Openings are provided in this chamber to admit the air to the cab, these openings being elongated orifices formed to direct the air throughout the cab. Vents are provided along the sides of the cab near the floor. Ultraviolet lamps may be provided for conditioning the air before its entrance to the cab.

In installations where a position indicator is provided in the car, it may be arranged in the wall of the plenum chamber between the orifices, thereby saving space. Also, the construction lends itself to indirect lighting of the cab, providing space for a light trough to be extended from the wall of the plenum chamber across the front of the cab with the plenum chamber wall acting as a reflector.

Features and advantages of the invention will be apparent from the following description and appended claim.

In the drawings:

Figure 2 is a sectional view of the top section of the cab as viewed from the inside of the car looking toward the front;

Figure 3 is an enlarged sectional detail taken along the line 3—3 of Figure 2;

Figure 4 is an enlarged sectional detail taken along the line 4—4 of Figure 2; and Figure 5 is a detail in section taken along the line 5—5 of Figure 3.

Figure 1:
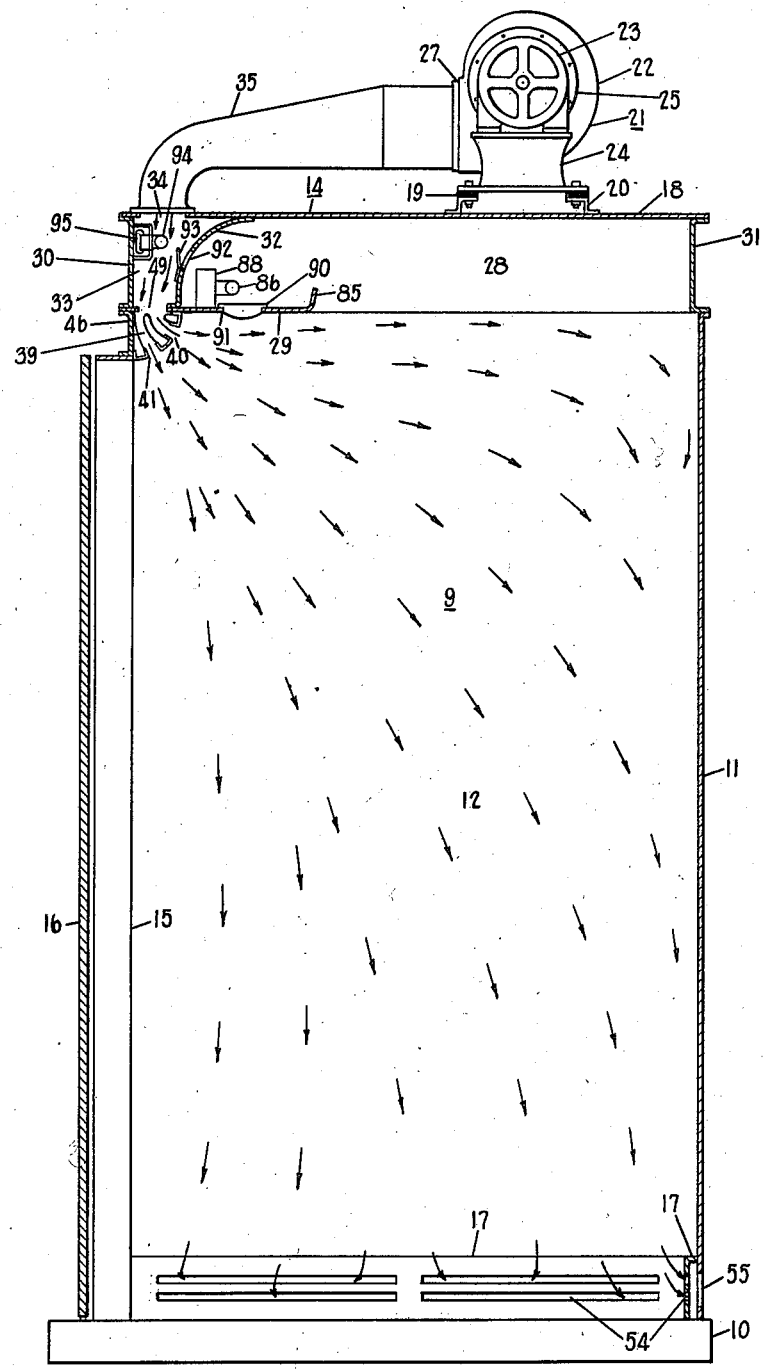
Figure 1 is a side view in section of an elevator car embodying the invention.

Referring to the drawings, the elevator car comprises a cab 9 secured to the car floor 10. The cab is made up of a plurality of panels to form the back 11, sides 12 and front sections 13. The top of the cab is provided with a canopy 14. A frame 15 is provided in the front of the car to form a door opening which is closed by a door 16. Kick plates 17 are provided around the bottom of the cab.

A pair of brackets 20 are secured as by welding to the top of the ceiling plate 18 of the canopy. A blower 21 is secured to these brackets, rubber pads 19 being provided between the blower and the brackets to minimize the transmission of vibrations from the blower to the cab. The blower comprises a centrifugal fan 22 driven by an electric motor 23 mounted on a stand 24 which is secured to the brackets 19. The fan is supported by a bracket plate 25 secured to the stand and the fan housing. The inlet 26 of the fan is from the side, while the outlet 27 extends horizontally from the bottom of the housing.

The canopy 14 comprises in addition to ceiling plate 18 a pair of side plates 28, a front plate 30 and a back plate 31. A plate 32, curving downwardly from ceiling plate 18, extends all the way across the front of the car and, in conjunction with front plate 30 and the front portions of side plates 28 and ceiling plate 18, forms a plenum chamber 33. The lower end of plate 32 is supported on a plate 29 extending horizontally across the front of the car and secured along the edge between the front plate 30 and a plate 46 extending across the front of the car above the door opening. An opening 34 is provided in the top of the plenum chamber through ceiling plate 18. This opening is connected by a duct 35 with the outlet 27 of the fan. This duct is of a construction to minimize the transmission of vibrations from the blower to the cab and may be of flexible material such as canvas or a metallic construction coated on the inside with a vibration deadening material. In case the duct is made of a fabric material, it may be connected to the blower and the plenum chamber by the use of clamping rings secured to the blower and ceiling plate as by screws. Also, it may be desirable to provide such a duct with shape retaining rings.

The plenum chamber leads through opening 49 in plate 29 into the lower end 39 of the chamber in which are discharge openings 40 and 41. To form these openings into orifices of the construction illustrated, three trough-like members 42, 43 and 44 are provided which extend all the way across the front of the cab and are secured at intervals to arcuate brackets 45. These brackets in turn are secured to plates 46 and 29 as by welding or screws, straps 56 being formed across opening 49 to which the brackets are secured. Slots 47 are provided in each of the trough-shaped members to receive the heads of bolts 48 which secure the members to the brackets. The trough-shaped members 42, 43 and 44 are tapered to receive and hold in place respectively vanes 50, 51 and 53 extending lengthwise of the members. These vanes are of a cross section to provide the desired shape of the orifices. These vanes are illustrated as of a solid material such as wood, but it is to be understood that they may also be formed by bending sheet metal to the desired shapes. The orifice 40 is somewhat wider than orifice 41 to direct more air across the top of the car. This tends to distribute the air evenly throughout the car. Elongated vents 54 are provided in the kick plates 17 to form outlets for the air from the cab. Openings 55 are provided in the walls of the cab behind the openings in the kick plates.

The cab is illustrated as provided with a position indicator 60. The indicator is arranged within the lower end 39 of the plenum chamber, in the middle portion 75 of trough-shaped member 43 in place of the vane 51 for such portion. The indicator comprises a plurality of light jewels 61, one for each of a plurality of floors, extending through apertures 62 in the outer face of trough-shaped member 43. These jewels are provided with flanges 63 for retaining the jewels in position, recesses 64 being formed in the trough-shaped member to receive these flanges. Behind the light jewels is a casing 65 which is divided into a plurality of compartments 66 by baffles 67. These baffles are positioned to provide equal sized compartments immediately in back of the light jewels. The lamps 68 for illuminating the jewels are of tubular shape and are mounted in sockets 69 secured to the base 70 of a lamp housing 71. The lid 72 of the housing is provided with a plurality of openings 73 through which the lamps extend, tubular flanges 57 being formed around these openings to provide light baffles. The housing is secured to brackets 74, in turn secured to plates 46 and 29, additional straps 56 being formed across opening 49 to which the brackets are secured. To facilitate the installation and removal for servicing of the position indicator, the middle section 75 of trough-shaped member 43 is made separate from the side sections 76 and is secured thereto at each end of the middle section as by a screw 77 threaded into a block 78 in turn secured to the side section. The inner ends of the side sections are supported by brackets 45. Casing 65 is provided at each end with a bracket 80 through which a bolt 81 extends to secure the casing to the section 75, the head of the bolt being arranged in slot 47. To locate the lamp housing with respect to casing 65 so as to position the lamps directly behind the jewel, a bracket 82 is secured to the cover 72 at each end thereof in position for the flange of the bracket to fit against the end of the casing.

The cab is illustrated as provided with indirect lighting. Plate 29 is extended inwardly of the cab from the plenum chamber and the inner end 85 is bent upwardly to form a trough. The lamps are arranged above the trough. These are illustrated as of the fluorescent type, two lamps 86 and 87 being shown. These lamps are mounted on fixtures 88 secured to plate 29. The plate 32 serves as a reflector for the lamps. A plurality of translucent lenses 90 may be provided in plate 29 beneath the lamps, these lenses being arranged in openings 91 formed in the plate. These lenses serve to admit light directly to the car to illuminate the threshold. Also, vents 92 may be provided in plate 32 and in such case light baffles 93 are provided behind these openings. The ventilating arrangement permits the indirect lighting trough to be kept near the ceiling of the canopy, thus saving considerable space and adding to the effective height of the cab.

If desired, ultra-violet lamps may be arranged in the plenum chamber to sterilize the air blown into the car from the blower. One of these lamps, designated 94, is illustrated directly beneath opening 34, this lamp being of tubular form and mounted in fixtures 95. Such arrangement is particularly suitable in cases where the elevator car is installed in a hospital.

It will be seen that with an elevator car constructed in accordance with the invention, all the appurtenances of modern cab construction are concentrated in a minimum of space. Also, a cab embodying these appurtenances may be economically manufactured. These appurtenances are positioned in their most favorable places from the standpoint of the function performed. For example, the plenum chamber across the front of the cab gives the most effective ventilation with economy of space and a minimum number of parts. The position indicator is in the front of the car in the direct view of the passengers and does not add to the space taken up in the car. The lighting across the front is efficient because cabs are as a rule of greater width than depth and does not detract from the effective height of the car. Also, the construction is adaptable to the modernization of old cabs by substituting the canopy with appurtenances for the canopy of the old car.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

An elevator car carrying a blower mounted above the car ceiling for supplying air to provide ventilation, said car comprising, a plate extending across the front of the car and curving downward from the ceiling of the car in spaced relation to the front wall of the car to form a plenum chamber, the ceiling of the car above said chamber having an opening to form an air inlet which is connected to said blower, a plurality of arcuate brackets secured to said front wall of the car immediately below said chamber and in spaced relation across the front of the car, and means secured to said brackets forming a convex surface extending across the front of the car and provided with elongated openings for directing air from said chamber into the car, said car having vents around the bottom thereof forming outlets for air from the car.

HARRY EMIL FRITZAM.
MORRISON JOHN BROUNN.